United States Patent
Logan et al.

(10) Patent No.: US 10,078,154 B2
(45) Date of Patent: Sep. 18, 2018

(54) DOWNHOLE SYSTEM WITH INTEGRATED BACKUP SENSORS

(71) Applicant: EVOLUTION ENGINEERING INC., Calgary (CA)

(72) Inventors: Aaron William Logan, Calgary (CA); Patrick R. Derkacz, Calgary (CA); Justin C. Logan, Calgary (CA); Barry Daniel Buternowsky, Calgary (CA); Mojtaba Kazemi Miraki, Calgary (CA)

(73) Assignee: Evolution Engineering Inc., Calgary (CA)

( * ) Notice: Subject to any disclaimer, the term of this patent is extended or adjusted under 35 U.S.C. 154(b) by 92 days.

(21) Appl. No.: 15/320,290

(22) PCT Filed: Jun. 10, 2015

(86) PCT No.: PCT/CA2015/050538
§ 371 (c)(1),
(2) Date: Dec. 19, 2016

(87) PCT Pub. No.: WO2015/192232
PCT Pub. Date: Dec. 23, 2015

(65) Prior Publication Data
US 2017/0199302 A1    Jul. 13, 2017

Related U.S. Application Data

(60) Provisional application No. 62/014,542, filed on Jun. 19, 2014.

(51) Int. Cl.
G01V 5/12    (2006.01)
G01V 13/00   (2006.01)

(52) U.S. Cl.
CPC ............. *G01V 13/00* (2013.01); *G01V 5/12* (2013.01)

(58) Field of Classification Search
CPC ............................ G01V 5/12; G01V 13/00
See application file for complete search history.

(56) References Cited

U.S. PATENT DOCUMENTS 6,263,095 B1 *  7/2001  Rushbrooke ....... G01N 21/6456
                                            382/128
7,253,401 B2   8/2007  Mickael et al.
(Continued)

FOREIGN PATENT DOCUMENTS

EP    0366567 A2    5/1990
EP    0900917 A1    3/1999
(Continued)

*Primary Examiner* — Casey Bryant
(74) *Attorney, Agent, or Firm* — Oyen Wiggs Green & Mutala LLP (57) ABSTRACT

A downhole system comprises a main sensor, such as a gamma sensor, and a backup sensor. The backup sensor may be of a different type from the main sensor. In some embodiments the backup sensor is a high reliability sensor that may have a different sensitivity from the main sensor. The system operates both the main and backup sensors and generates calibration data for the backup sensor. If the main sensor fails the calibration data may be applied to process data from the backup sensor to yield an estimate of the data that the main sensor would have yielded if it had remained operational. The calibration data may compensate for temperature variations and/or temporal drift, for example.

30 Claims, 5 Drawing Sheets

(56) References Cited

U.S. PATENT DOCUMENTS

| | | | |
|---|---|---|---|
| 7,848,887 B2 * | 12/2010 | Yang | E21B 7/04 |
| | | | 324/338 |
| 8,121,971 B2 | 2/2012 | Edwards et al. | |
| 8,210,280 B2 | 7/2012 | Trinh et al. | |
| 8,434,356 B2 | 5/2013 | Hsu et al. | |
| 2005/0203697 A1 | 9/2005 | Dalgleish | |
| 2010/0108379 A1 | 5/2010 | Edbury et al. | |
| 2011/0266055 A1 | 11/2011 | Digiovanni et al. | |
| 2014/0179555 A1 | 6/2014 | Walt et al. | |
| 2014/0275899 A1 | 9/2014 | Gottlieb et al. | |

FOREIGN PATENT DOCUMENTS

| | | |
|---|---|---|
| EP | 2759674 A2 | 7/2014 |
| WO | 2004011775 A2 | 2/2004 |
| WO | 2013074593 A1 | 5/2013 |
| WO | 2014085935 A1 | 6/2014 |
| WO | 2014100318 A1 | 6/2014 |
| WO | 2014127489 A1 | 8/2014 |
| WO | 2014194418 A1 | 12/2014 |

* cited by examiner

DOWNHOLE SYSTEM WITH INTEGRATED BACKUP SENSORS

CROSS-REFERENCE TO RELATED APPLICATION

This application claims priority from U.S. Application No. 62/014,542 filed 19 Jun. 2014. For purposes of the United States, this application claims the benefit under 35 U.S.C. § 119 of U.S. Application No. 62/014,542 filed 19 Jun. 2014 and entitled DOWNHOLE SYSTEM WITH INTEGRATED BACKUP SENSORS which is hereby incorporated herein by reference for all purposes.

TECHNICAL FIELD

This application relates to subsurface drilling, specifically, to systems which include downhole sensors such as radiation sensors. Embodiments are applicable to drilling wells for recovering hydrocarbons.

BACKGROUND

Recovering hydrocarbons from subterranean zones typically involves drilling wellbores.

Wellbores are made using surface-located drilling equipment which drives a drill string that eventually extends from the surface equipment to the formation or subterranean zone of interest. The drill string can extend thousands of feet or meters below the surface. The terminal end of the drill string includes a drill bit for drilling (or extending) the wellbore. Drilling fluid, usually in the form of a drilling "mud", is typically pumped through the drill string. The drilling fluid cools and lubricates the drill bit and also carries cuttings back to the surface. Drilling fluid may also be used to help control bottom hole pressure to inhibit hydrocarbon influx from the formation into the wellbore and potential blow out at surface.

Bottom hole assembly (BHA) is the name given to the equipment at the terminal end of a drill string. In addition to a drill bit, a BHA may comprise elements such as: apparatus for steering the direction of the drilling (e.g. a steerable downhole mud motor or rotary steerable system); sensors for measuring properties of the surrounding geological formations (e.g. sensors for use in well logging); sensors for measuring downhole conditions as drilling progresses; one or more systems for telemetry of data to the surface; stabilizers; heavy weight drill collars; pulsers; and the like. The BHA is typically advanced into the wellbore by a string of metallic tubulars (drill pipe).

Modern drilling systems may include any of a wide range of mechanical/electronic systems in the BHA or at other downhole locations. Such electronics systems may be packaged as part of a downhole system. A downhole system may comprise any active mechanical, electronic, and/or electromechanical system that operates downhole. A downhole system may provide any of a wide range of functions including, without limitation: data acquisition; measuring properties of the surrounding geological formations (e.g. well logging); measuring downhole conditions as drilling progresses; controlling downhole equipment; monitoring status of downhole equipment; directional drilling applications; measuring while drilling (MWD) applications; logging while drilling (LWD) applications; measuring properties of downhole fluids; and the like. A downhole system may comprise one or more systems for: telemetry of data to the surface; collecting data by way of sensors (e.g. sensors for use in well logging) that may include one or more of vibration sensors, shock sensors, magnetometers, inclinometers, accelerometers, nuclear particle detectors, radiation sensors, electromagnetic detectors, acoustic detectors, and others; acquiring images; measuring fluid flow; determining directions; emitting signals, particles or fields for detection by other devices; interfacing to other downhole equipment; sampling downhole fluids; etc.

Downhole conditions can be harsh. A downhole system may experience high temperatures; vibrations (including axial, lateral, and torsional vibrations); shocks; immersion in drilling fluids; high pressures (20,000 p.s.i. or more in some cases); turbulence and pulsations in the flow of drilling fluid past the downhole system; fluid initiated harmonics; and torsional acceleration events from slip which can lead to side-to-side and/or torsional movement of the downhole system. These conditions can shorten the lifespan of downhole system and can increase the probability that a downhole system will fail in use. Replacing a downhole system that fails while drilling can involve very great expense.

A downhole system may communicate a wide range of information to the surface by telemetry. Telemetry information can be invaluable for efficient drilling operations. For example, telemetry information may be used by a drill rig crew to make decisions about controlling and steering the drill bit to optimize the drilling speed and trajectory based on numerous factors, including legal boundaries, locations of existing wells, formation properties, hydrocarbon size and location, etc. A crew may make intentional deviations from the planned path as necessary based on information gathered from downhole sensors and transmitted to the surface by telemetry during the drilling process. The ability to obtain and transmit reliable data from downhole locations allows for relatively more economical and more efficient drilling operations.

There are several known telemetry techniques. These include transmitting information by generating vibrations in fluid in the bore hole (e.g. acoustic telemetry or mud pulse (MP) telemetry) and transmitting information by way of electromagnetic signals that propagate at least in part through the earth (EM telemetry). Other telemetry techniques use hardwired drill pipe, fibre optic cable, or drill collar acoustic telemetry to carry data to the surface.

Advantages of EM telemetry, relative to MP telemetry, include generally faster baud rates, increased reliability due to no moving downhole parts, high resistance to lost circulating material (LCM) use, and suitability for air/underbalanced drilling. An EM system can transmit data without a continuous fluid column; hence it is useful when there is no drilling fluid flowing. This is advantageous when a drill crew is adding a new section of drill pipe as the EM signal can transmit information (e.g. directional information) while the drill crew is adding the new pipe. Disadvantages of EM telemetry include lower depth capability, incompatibility with some formations (for example, high salt formations and formations of high resistivity contrast), and some market resistance due to acceptance of older established methods. Also, as the EM transmission is strongly attenuated over long distances through the earth formations, it requires a relatively large amount of power so that the signals are detected at surface. The electrical power available to generate EM signals may be provided by batteries or another power source that has limited capacity.

A typical arrangement for electromagnetic telemetry uses parts of the drill string as an antenna. The drill string may be divided into two conductive sections by including an insulating joint or connector (a "gap sub") in the drill string. The gap sub is typically placed at the top of a bottom hole assembly such that metallic drill pipe in the drill string above the BHA serves as one antenna element and metallic sections in the BHA serve as another antenna element. Electromagnetic telemetry signals can then be transmitted by applying electrical signals between the two antenna elements. The signals typically comprise very low frequency AC signals applied in a manner that codes information for transmission to the surface. (Higher frequency signals attenuate faster than low frequency signals.) The electromagnetic signals may be detected at the surface, for example by measuring electrical potential differences between the drill string or a metal casing that extends into the ground and one or more ground rods.

There remains a need for reliable downhole system.

SUMMARY

This invention has a number of aspects. One aspect provides downhole apparatus which includes sensors for sensing downhole conditions. The sensors may comprise gamma sensors, for example. Another aspect provides methods for handling sensor data from sensors in downhole tools. Methods according to some aspects provide backup sensor readings which are calibrated to match readings of a main sensor. If the main sensor fails then the calibrated backup sensor readings may be substituted for the main sensor readings.

One aspect of the invention provides a sensor system for use in a downhole system. The sensor system comprises: a first sensor (e.g. a main sensor) operable to sense an environmental property; a second sensor (e.g. a backup sensor) operable to sense the environmental property; and a controller in communication with the first and second sensors. The controller is configured to: receive, from the first sensor, a first calibration sensor reading acquired at a first time and receive, from the second sensor, a second calibration sensor reading acquired at substantially the first time. The controller is also configured to determine, based on the first and second calibration sensor readings, calibration information for the second sensor. When the controller receives from the second sensor, a backup sensor reading acquired at a second time subsequent to the first time the controller may determine, based on the calibration information and the backup sensor reading, an estimated replacement sensor reading estimating a sensor reading by the first sensor at the second time. This estimated sensor reading may be used in place of corresponding reading from the first sensor if the first sensor fails. In some embodiments the controller is configured to calibrate the second sensor to estimate the output of the first sensor so that the backup sensor reading comprises the estimated replacement sensor reading.

In some embodiments the controller is configured to receive, from the first sensor, a plurality of sensor readings, the plurality of sensor readings comprises the first calibration sensor reading and each of the plurality of sensor readings acquired at a time prior to the second time; and the controller is configured to determine the calibration information for the second sensor based on the plurality of sensor readings and the second calibration sensor reading, calibration information for the second sensor. In some embodiments the calibration information comprises a calibration curve. The calibration curve may define a correspondence between one or more calibration factors and an adjustment value such that adjusting the output of the second sensor based on the adjustment value provides an estimate of the output of the first sensor. In some embodiments the one or more calibration factors comprise a temperature of at least one of the first and second sensors. In some embodiments the one or more calibration factors comprise the second time.

In some embodiments the controller is configured to determine, based on the calibration information, the estimated replacement sensor reading in response to detecting a failure of the first sensor. In some embodiments the controller is configured to check the first sensor for an indication of the failure.

In some embodiments each of the first and second sensors is housed in a rotatable element in the downhole system, each of the first and second sensors is directionally sensitized so that the first sensor senses in substantially a first direction and the second sensor senses in substantially a second direction. Each of the first and second sensors may be directionally sensitized by shielding each of the first and second sensors on one or more sides. In some embodiments the first sensor travels along a circumferential path while the rotatable element rotates; a plurality of circumferential segments are defined on the circumferential path, each of the circumferential segment associated with a bin; and for each of the circumferential segments, sensor readings acquired by the first sensor while travelling along the circumferential segment are associated with the bin associated with the circumferential segment. In some such embodiments the second sensor is angularly offset from the first sensor along the circumferential path; for each of the circumferential segments, sensor readings acquired by the second sensor while travelling along the circumferential segment are associated with a second bin associated with a second circumferential segment; and the second circumferential segment is offset from the circumferential segment by a distance corresponding to the angular offset between the first sensor and the second sensor.

In some embodiments the first sensor comprises a multidirectional sensor operable to sense the environmental property in a plurality of directions and the second sensor comprises one or more unidirectional sensors. In some such embodiments each of the one or more unidirectional sensors is configured to sense in one of the plurality of directions. In some such embodiments a processor is configured to determine the estimated replacement sensor reading based on, for at least a first one of the plurality of directions, a sensor reading acquired by the first sensor and based on, for at least a second one of the plurality of directions, the backup sensor reading. The processor may be in communication with a telemetry system and configured to transmit the backup sensor reading and the estimated replacement sensor reading via the telemetry system.

In some embodiments the first and second sensors share a physical interface with the controller. In some alternative embodiments the first sensor has a first physical interface with the controller and the second sensor has a second physical interface with the controller.

The first and second sensors may comprise accelerometers. For example, the first sensor may comprise a multi-axis accelerometer and the second sensor may comprise one or more single-axis accelerometers.

The first and second sensors may comprise gamma radiation sensors. In some such embodiments the first sensor comprises a photomultiplier tube. In some such embodiments the second sensor comprises a solid-state gamma radiation sensor. For example, the second sensor may be a diode-based gamma radiation sensor.

In some embodiments the controller is configured to continually calibrate the second sensor against the first sensor while the first sensor is working.

The second sensor may optionally be less sensitive than the first sensor.

In some embodiments the controller is configured to obtain a reading from a third sensor taken substantially at the first time. The third sensor is configured to sense a second environmental property distinct from the environmental property. In such embodiments the controller is configured to base the calibration information for the second sensor in part on the reading from the third sensor. For example the third sensor may be a temperature sensor. In some such embodiments the controller is configured to generate a calibration function relating readings of the second sensor to readings of the first sensor as a function of temperature.

The controller may be configured to maintain a log containing a history of comparisons of readings from the first and second sensors. The log optionally comprises temperature readings corresponding to the readings of the first and second sensors. In some embodiments the log comprises times corresponding to the readings of the first and second sensors. The controller may be configured to process data from the log to yield one or more calibration curves which relate the sensitivity of the second sensor to the sensitivity of the first sensor as a function of temperature. In some embodiments the calibration curves include curves that which relate the sensitivity of the second sensor to the sensitivity of the first sensor as a function of time. In some embodiments the controller is configured to estimate a rate of drift of the sensitivity of the second sensor (which may be a backup gamma sensor, for example).

In some embodiments the controller is configured to transmit the calibration information to surface equipment together with readings from the second sensor. The transmitted calibration information may comprise comprises an offset (or bias) and/or a scale factor, for example. In some embodiments the transmitted calibration information includes a parameter representing a rate of drift of a parameter of the calibration information.

In some embodiments the controller is configured to transmit the calibration information to surface equipment together with a measure of quality of a current calibration. In some embodiments the measure of quality comprises a residual based on differences between one or more readings of the first sensor and one or more corresponding estimated replacement sensor readings.

In some the first and second sensors are contained in a housing of a downhole tool and the system comprises surface equipment and a telemetry system providing data communication between the downhole tool and the surface equipment. In such embodiments determining the estimated replacement sensor reading may be performed at the surface equipment and/or at the downhole tool. The controller is optionally distributed and may include a first component at a downhole tool that comprises the first and second sensors and a second component at a surface location and a telemetry system providing data communication between the first and second components.

In some embodiments the controller is configured to periodically take new readings from the first and second sensors and to update the calibration information for the second sensor based on the new readings from the first and second sensors. In some embodiments the controller is configured to automatically process readings from the second sensor using the calibration information to yield estimated readings for the first sensor and to transmit the estimated readings to surface equipment in response to detecting a failure of the first sensor.

Another aspect of the invention provides a method for sensing an environmental property in a downhole environment. The method comprises: receiving, from a first sensor, a first calibration sensor reading acquired at a first time; receiving, from a second sensor, a second calibration sensor reading acquired at substantially the first time; and determining, based on the first and second calibration sensor readings, calibration information for the second sensor. Subsequently the method receives from the second sensor a backup sensor reading acquired at a second time subsequent to the first time and determines, based on the calibration information and the backup sensor reading an estimated replacement sensor reading estimating a sensor reading by the first sensor at the second time. The method may process readings from the second sensor using the calibration information to yield estimated readings for the first sensor. The method may supply the estimated readings to a process requesting readings from the second sensor.

Some embodiments involve periodically updating the calibration information using the readings from the second sensor and corresponding readings from the first sensor. The method may comprise receiving, from the first sensor, a plurality of sensor readings, the plurality of sensor readings comprises the first calibration sensor reading and each of the plurality of sensor readings acquired at a time prior to the second time. In such embodiments determining calibration information for the second sensor may comprise determining, based on the plurality of sensor readings and the second calibration sensor reading, calibration information for the second sensor.

In some embodiments the calibration information comprises a calibration curve defining a correspondence between one or more calibration factors and an adjustment value, wherein adjusting the output of the second sensor based on the adjustment value provides an estimate of the output of the first sensor.

In some the one or more calibration factors comprise a temperature of at least one of the first and second sensors and/or the one or more calibration factors comprise the second time. Some embodiments comprise determining, based on the calibration information, the estimated replacement sensor reading in response to detecting a failure of the first sensor. The first sensor may be checked periodically for an indication of failure.

Some embodiments comprise rotating the first sensor about a rotation axis so that the first sensor travels along a circumferential path; defining a plurality of circumferential segments on the circumferential path; associating a bin with each circumferential segment; and for each of the circumferential segments, associating sensor readings acquired by the first sensor while travelling along the circumferential segment with the bin associated with the circumferential segment. In some embodiments rotating the second sensor about the rotation axis so that the second sensor travels along the circumferential path, the second sensor offset along the circumferential path relative to the first sensor and for each of the circumferential segments the method associates sensor readings acquired by the second sensor while travelling along the circumferential segment with a second bin associated with a second circumferential segment wherein the second circumferential segment is offset from the circumferential segment by a distance corresponding to the offset between the first sensor and the second sensor.

Some embodiments comprise determining the estimated replacement sensor reading based on, for at least a first one of a plurality of directions, a sensor reading acquired by the first sensor and based on, for at least a second one of the plurality of directions, the backup sensor reading.

In some embodiments the environmental property is acceleration and/or gamma radiation.

The backup sensor reading and/or the estimated replacement sensor reading may be transmitted via a telemetry system.

Some embodiments comprise continually calibrating the second sensor against the first sensor while the first sensor is working.

Some embodiments comprise obtaining a reading from a third sensor taken substantially at the first time. The third sensor is configured to sense a second environmental property distinct from the environmental property. The method may base the calibration information for the second sensor in part on the reading from the third sensor. The reading from the third sensor may indicate temperature for example. In some embodiments the method comprises generating a calibration function relating readings of the second sensor to readings of the first sensor as a function of temperature or generating a plurality of calibration functions, each of the calibration functions corresponding to a different temperature range.

Some embodiments comprise maintaining a log containing a history of comparisons of readings from the first and second sensors. The log may comprise temperature readings corresponding to the readings of the first and second sensors and/or times corresponding to the readings of the first and second sensors. In some embodiments the method comprises processing data from the log to yield one or more calibration curves which relate the sensitivity of the second sensor to the sensitivity of the first sensor as a function of temperature. The calibration curves may include curves which relate the sensitivity of the second sensor to the sensitivity of the first temperature as a function of time.

Some embodiments comprise estimating a rate of drift of the sensitivity of the second sensor relative to the sensitivity of the first sensor. The estimated rate of drift may be used to correct the calibration function for the drift.

Some embodiments comprise determining a measure of quality of the calibration. The measure of quality may be transmitted to surface equipment together with an estimated reading of the first sensor and/or the calibration information. In some embodiments the measure of quality comprises a residual based on differences between one or more readings of the first sensor and one or more corresponding estimated replacement sensor readings.

Some embodiments involve periodically taking new readings from the first and second sensors and updating the calibration information for the second sensor based at least in part on the new readings from the first and second sensors. Some embodiments comprise automatically process readings from the second sensor using the calibration information to yield estimated readings for the first sensor and transmitting the estimated readings to surface equipment in response to detecting a failure of the first sensor.

Further aspects of the invention and features of illustrative example embodiments which can be combined in any suitable combinations to yield further example embodiments are described below and/or illustrated in the accompanying drawings.

BRIEF DESCRIPTION OF THE DRAWINGS

The accompanying drawings illustrate non-limiting example embodiments of the invention.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

Figure 1:
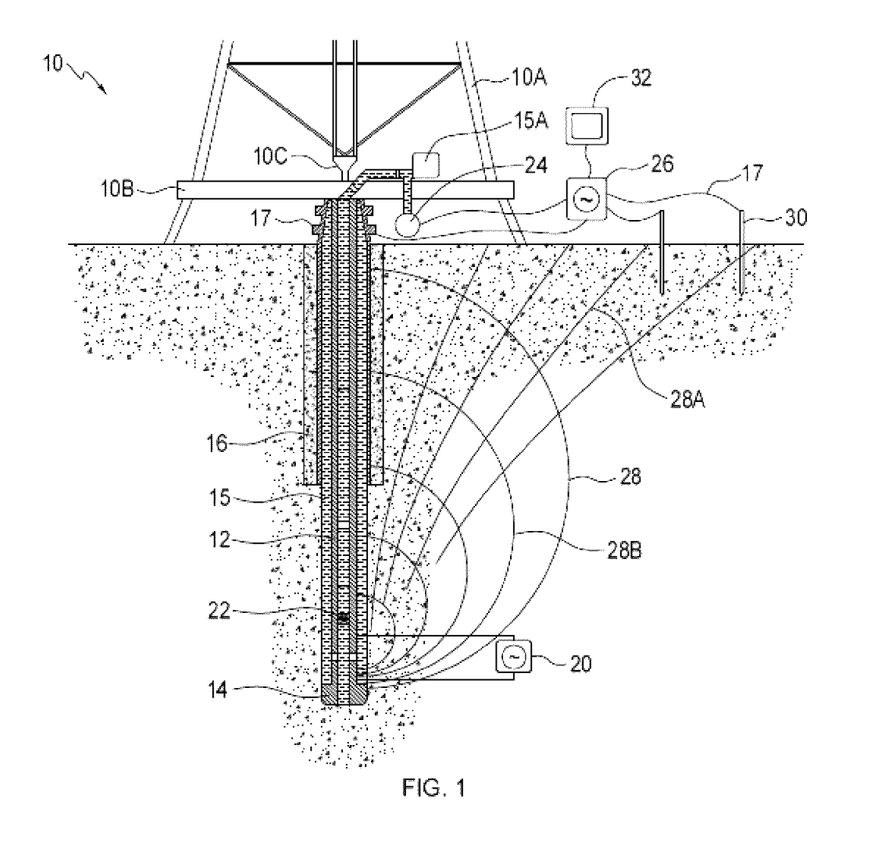
FIG. 1 is a schematic view of a drilling operation.

FIG. 1 shows schematically an example drilling operation. A drill rig 10 drives a drill string 12 which includes sections of drill pipe that extend to a drill bit 14. The illustrated drill rig 10 includes a derrick 10A, a rig floor 10B and draw works 10C for supporting the drill string. Drill bit 14 is larger in diameter than the drill string above the drill bit. An annular region 15 surrounding the drill string is typically filled with drilling fluid. The drilling fluid is pumped through a bore in the drill string to the drill bit and returns to the surface through annular region 15 carrying cuttings from the drilling operation. As the well is drilled, a casing 16 may be made in the well bore. A blow out preventer 17 is supported at a top end of the casing. The drill rig illustrated in FIG. 1 is an example only. The methods and apparatus described herein are not specific to any particular type of drill rig.

One aspect of this invention provides downhole tools which include radiation sensors, for example, gamma sensors. Currently, the gamma sensors that yield highest accuracy are scintillation-type detectors which include a light amplifier such as a photo multiplier tube (PMT) which detects light emitted when gamma rays interact with a crystal. While such sensors can be fairly reliable, they may fail, particularly under downhole conditions which include significant shock, vibration, and relatively high temperatures. Other types of gamma sensors exist, but these other types of gamma sensors typically have deficiencies. For example, they tend to be less sensitive than PMT-based gamma sensors and furthermore, their sensitivity tends to be fairly temperature dependent. Consequently, the state-of-the-art downhole tools which include radiation sensors typically use PMT-type radiation sensors.

Some embodiments of the present invention provide backup gamma sensors which may be used to provide gamma readings in the event that a main gamma sensor fails. In some such embodiments the main gamma sensor and backup gamma sensor can be of different types. For example, the main gamma sensor may be a PMT-type gamma sensor whereas the backup gamma sensor may be a less-sensitive, but more reliable solid-state gamma sensor such as a diode-based gamma sensor.

As mentioned above, one problem with diode-based gamma sensors is that their sensitivity can be highly temperature dependent. In addition to this, the sensitivity of such gamma sensors can drift for various other reasons. Consequently, the output of a diode-type gamma sensor tends not to be very reliable because the sensitivity of the diode-type gamma sensor (i.e. the relationship between radiation dose and counts) is not reliably known.

In some embodiments, the problem that the sensitivity of a backup gamma sensor may have drifted is addressed by providing a routine which continually calibrates the backup gamma sensor against the main gamma sensor while the main gamma sensor is working. Thus, if it becomes necessary to switch to the backup gamma sensor, the backup gamma sensor will have been recently calibrated.

In some embodiments, more sophisticated calibration schemes are used. For example, the downhole tool may contain a log of a history of comparisons of readings from the main and backup gamma sensors. The log may also comprise temperature readings. The information in the log may be processed to yield calibration curves which relate the sensitivity of the backup sensor (as determined by comparison with the main gamma sensor) as a function of temperature, time, and/or other factors. The times at which the logged gamma readings were made may also be recorded in the downhole tool. This may facilitate an estimate of the rate of drift of the sensitivity of the backup gamma sensor.

For example, an example method for in-situ calibration of the backup gamma sensor is as follows:

$$V(t, T) = \frac{1}{n}\sum_{i=1}^{n}(CM_i - CB_i)^2 = \frac{1}{n}\sum_{i=1}^{n} r_i^2 \quad (1)$$

in which V is the variance, t is time, T is temperature, n is the number of sample points over a preconfigured time window (tc), $CM_i$ is the gamma-ray count of the main gamma sensor at the $i^{th}$ sample point, $CB_i$ is the output of a calibration function defined by one or more calibration parameters which takes as input the raw gamma-ray count $CBraw_i$ of the backup gamma sensor at the $i^{th}$ sample point and has an output that estimates the corresponding count $CM_i$ of the main gamma sensor and $r_i$ is called residual. A calibration coefficient can be calculated in-situ by minimizing V. For instance, if the residual r is assumed constant over the time window tc, and the calibration function is given by: $CB_i=b+CBraw_i$ where the calibration coefficient (which in this case will be a bias b) may be calculated from:

$$b(t, T) = \frac{1}{n}\sum_{i=1}^{n} r_i \quad (2)$$

Alternatively, more sophisticated algorithms can be used to find several calibration coefficients simultaneously. For example, V can be minimized to simultaneously find scale factor, s, and bias, b, which relate readings of the backup sensor to corresponding readings of the main sensor as follows:

$$CB_i = CBraw_i \times s + b, e = [s \ b]^T, \quad (3)$$
$$V(t, T) = \frac{1}{n}\sum_{i=1}^{n}[CM_i(s \times CBraw_i + b)]^2$$

-continued
$$e_k \approx e_{k-1} - (\partial^2 V / \partial e^2)^{-1}(\partial V / \partial e) = \quad (4)$$

$$e_{k-1} - \begin{bmatrix} \sum_{i=1}^{n} CM_i^2 & \sum_{i=1}^{n} CM_i \\ \sum_{i=1}^{n} CM_i & n \end{bmatrix}^{-1} \begin{bmatrix} \sum_{i=1}^{n} (-CM_i)[CM_i(1-s)-b] \\ \sum_{i=1}^{n} [b - CM_i(1-s)] \end{bmatrix}$$

in which s is scale factor, b is bias, e is the vector of unknowns, and k is the iteration number in an iterative minimization algorithm.

For each time increment tc, the calculated calibration coefficients (i.e. b and s) may be stored together with an associated temperature or functions or tables which specify the coefficients as a function of temperature may be stored.

If the main gamma sensor fails the calibration curve (e.g. the coefficients or the corresponding functions or tables) can be used to obtain an estimate of the current sensitivity of the backup gamma sensor (for example, as a function of one or more of temperature, time, and other factors). This information may then be applied to correct the readings from the backup gamma sensor to compensate for differences in the current sensitivity of the backup gamma sensor and the sensitivity that the main gamma sensor would have had if it were still working properly. In an example embodiment, for each time increment tc and at each temperature point, the residual r can be calculated as an indicator of calibration quality and this indicator can be transmitted to the surface along with gamma counts from the back-up sensor.

Figure 2:
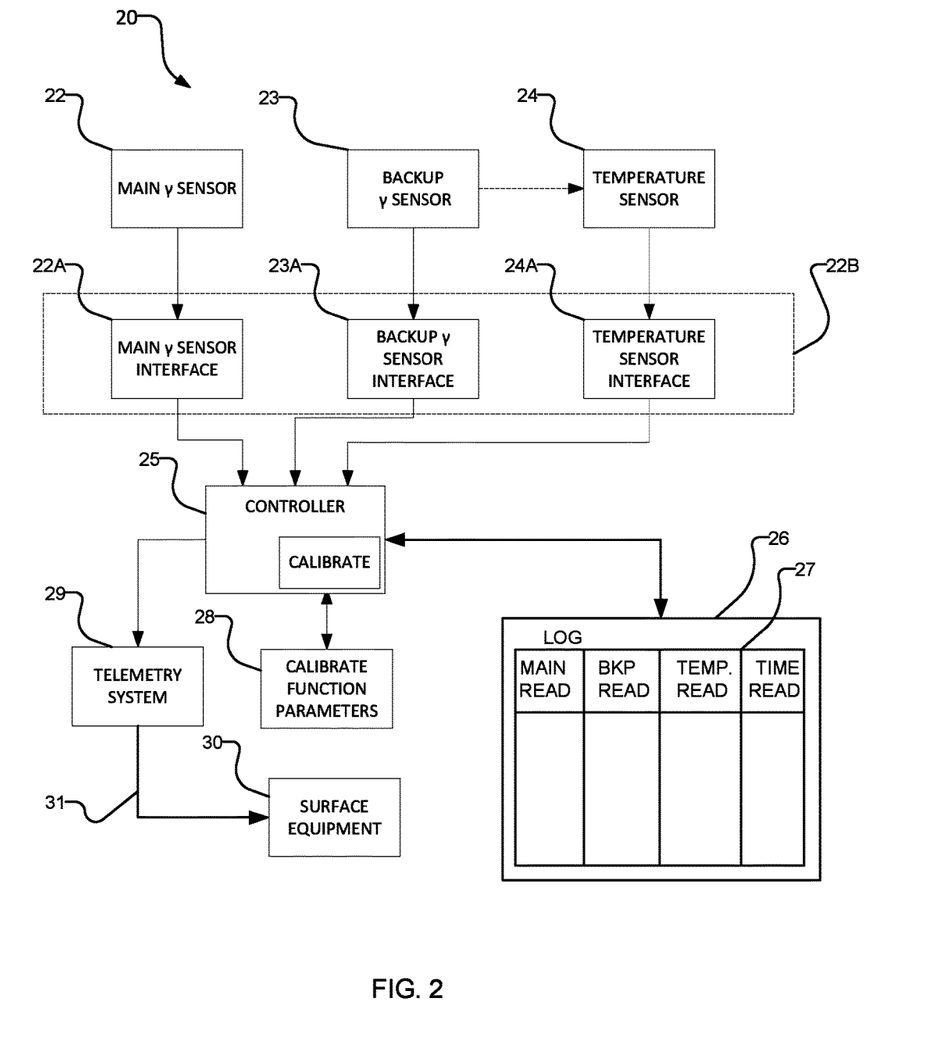
FIG. 2 is a schematic view of an example downhole system having backup sensors.

FIG. 2 is a block diagram of a downhole tool 20 according to an example embodiment. Downhole tool 20 includes a main radiation sensor, for example, a gamma ray sensor 22 which is in data communication with a controller 25 by way of a suitable interface 22A. Downhole tool 20 also includes a backup gamma sensor 23 which is in communication with controller 25 by way of a suitable interface 23A. By way of interfaces 22A and 23A, controller 25 may receive current gamma readings from main gamma sensor 22 and backup gamma sensor 23. A temperature sensor 24 is provided. Temperature sensor 24 directly or indirectly monitors a temperature of backup gamma sensor 23. Readings from temperature sensor 24 are made available to controller 25 by way of a suitable temperature sensor interface 24A.

In the illustrated embodiment, controller 25 has access to a data store 26 into which controller 25 can log readings from main gamma sensor 22, backup gamma sensor 23, and temperature sensor 24 in a data structure which provides a log 27.

Controller 25 may comprise a programmable data processor that executes software (or firmware) instructions stored in a program store accessible to controller 25. In addition or in the alternative, controller 25 may comprise hard-wired logic or configurable logic such as one or more application-specific integrated circuits (ASICS), or field-programmable gate arrays (FPGAs). Controller 25 includes a calibration algorithm (specified by either of or a combination of software instructions and configuration of logic circuits) which reads the values from log 27 and processes those values to yield a calibration function for main gamma sensor 22. The calibration algorithm may also take into account information regarding the environment of the main and backup gamma sensors, such as the dimensions of the drill collar in which the gamma sensors are located, the nature of the drilling fluid being used (in relation to the attenuation provided by the drilling fluid and whether or not the drilling fluid contains potassium or other elements that emit gamma radiation), and the size of the annulus between the drill collar and the surrounding formations. This information may be stored, either in the form of a single parameter value or as a series of parameter values in a memory accessible to controller 25. Controller 25 may perform a calibration such that the adjusted gamma readings yield correct API formation values. Controller 25 stores calibration function parameters 28 which specify the calibration function either in data store 26 or another suitable data store or register.

Controller 23 may also generate a calibration function for backup gamma sensor 23. In some embodiments the calibration function for backup sensor 23 is based on data from main gamma sensor 22 corrected using the calibration function for main gamma sensor 22. An advantage of calibrating backup gamma sensor 23 based on corrected readings taken by main gamma sensor 22 is that the calibration of backup sensor 23 is therefore automatically corrected to account for environmental factors such as drill collar dimensions.

Downhole tool 20 includes a telemetry system 29 adapted for transmitting data from downhole tool 20 directly or indirectly to surface equipment 30 by way of a communication path 31. Any suitable telemetry method may be implemented by telemetry system 29. For example, in some embodiments, telemetry system 29 comprises an EM telemetry system which communicates with surface equipment 30 either directly or by way of a number of EM nodes, relays or repeaters spaced apart along the drill string. In some embodiments, telemetry system 29 comprises, in addition or in the alternative to an EM telemetry system a MP telemetry system and/or an acoustic telemetry system.

Figure 3:
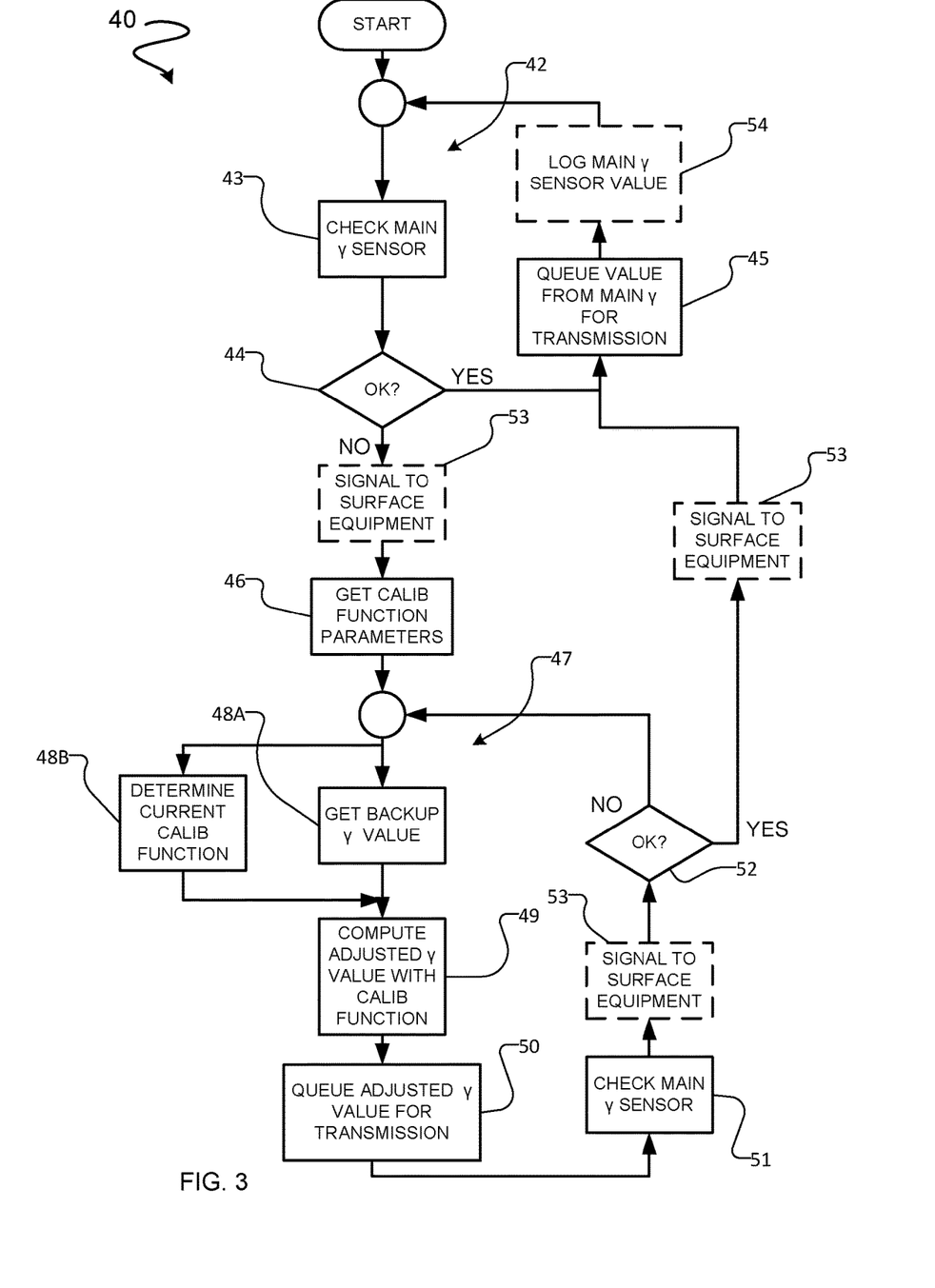
FIG. 3 is a flow chart illustrating a method that may be performed at or using a downhole system.

FIG. 3 illustrates a method 40 that may be implemented by controller 25. Method 40 includes a loop 42 which checks main gamma sensor 22 for proper operation. The check implemented in block 43 may, for example, check on-board diagnostics provided in main gamma sensor 22 or main gamma sensor interface 22A; in addition or in the alternative block 43 may check values output by main gamma sensor 22. For example, if the values are consistently zero or a number that is excessive or if the values fail to match values obtained by backup sensor 23 within a tolerance selected to account for possible drift in the sensitivity of backup gamma sensor 23, then block 43 may conclude that main gamma sensor 22 is not working properly.

If block 44 determines that main gamma sensor 22 is working properly, then loop 42 proceeds to block 45 which queues the current value from the main gamma sensor for transmission. Loop 42 may optionally proceed to block 54 which logs the current value (and/or one or more previous values) from the main gamma sensor, as described above. The logging of block 54 may, optionally, occur prior to or in parallel with the queuing of block 45. A delay may optionally be included in loop 42 to collect values from main gamma sensor 22 at a reasonable spacing and time.

If the check in block 43 indicates that main gamma sensor 22 is not working properly, then block 44 shifts execution to block 46 which gets a current calibration function, for example by retrieving parameters 28. A message informing the surface equipment that the main gamma sensor is not functioning properly is optionally provided at block 53. Method 40 then continues with loop 47. In loop 47, block 48A retrieves a value from backup gamma sensor 23 and block 48B determines a current calibration function (for example, the current calibration function may depend on current values for time and/or temperature). Block 49 computes an adjusted gamma value by applying the calibration function to the value obtained in block 48A. Block 50 queues the adjusted gamma value for transmission. Loop 47 then repeats.

In some embodiments, if main gamma sensor 22 has been determined to be not working properly, method 40 checks periodically to determine whether main gamma sensor 22 is again working properly. In the example embodiment of FIG. 3, this check is performed at block 51. If block 51 determines that main gamma sensor 22 is again functioning properly then block 52 branches back to block 45. A message informing the surface equipment that the main gamma sensor is again functional is optionally provided at block 53.

In another example embodiment, if block 51 determines that main gamma sensor 22 is again functional, block 52 branches to block 53 to inform surface equipment and method 40 continues to execute loop 47. The surface equipment (either automatically or under user command) may then optionally send a downlink command that causes a switch to transmitting values from main gamma sensor 22.

In block 45 controller 25 optionally causes downhole tool 20 to send a signal to the surface equipment indicating failure of the main gamma sensor.

Various alternative embodiments are possible. Some of these alternative embodiments provide a different distribution of control and processing between a downhole tool 20 and surface equipment 30. For example, in some embodiments, downhole tool 20 simply transmits values read from main gamma sensor 22 and backup gamma sensor 23 to the surface. Together with other readings, such as temperature and time, surface equipment 30 may then maintain log 27 and may perform the steps of loops 42 and 47 at the surface.

FIG. 2 shows an example in which each sensor has a dedicated interface (e.g. 22A, 23A, 24A). This is convenient in the case where it is desired to use off-the-shelf 'third-party' sensors in a downhole tool 20. Each sensor may have a dedicated circuit that reads the sensor, controls the sensor (e.g. by supplying appropriate power and control voltages to the sensor) and converts the sensor output values into a data format for providing to controller 25. In such cases, controller 25 may comprise separate interface cards to receive the data from the different sensors, especially in cases where the sensors are provided by different parties and may have different output data formats. However, providing separate interfaces for each sensor (which may be, for example, provided in separate circuit boards) can result in the downhole tool requiring more volume than would be desired and/or being less power-efficient and/or having more potential failure points than would be desired. The size of the downhole tool may be reduced by providing a single interface or sensor integrating circuit which is customized to provide direct interfacing to a plurality of sensors, for example, main sensor 22, backup gamma sensor 23, and temperature sensor 24. Such a combined interface is indicated in FIG. 2 by the dashed line 22B. Such a combined interface circuit may interface directly to each of a plurality of sensors, therefore, rendering unnecessary separate interface electronics.

Downhole tool may incorporate a wide range of additional sensors. These additional sensors may include sensors such as pressure sensors, inclination sensors, direction sensors, resistivity sensors, oil/water-cut sensors, and the like. In some embodiments, a single interface 22B interfaces to all sensors in downhole tool 20 or all but one or two sensors in downhole tool 20.

In some embodiments, the space saved by using a single interface 22B is sufficient to allow a downhole tool to include both main and backup gamma sensors in a tool occupying the same volume as a comparable tool lacking a backup gamma sensor. Providing a single interface circuit can also save electrical power as compared to providing multiple interface circuits for multiple sensors.

Figure 4:
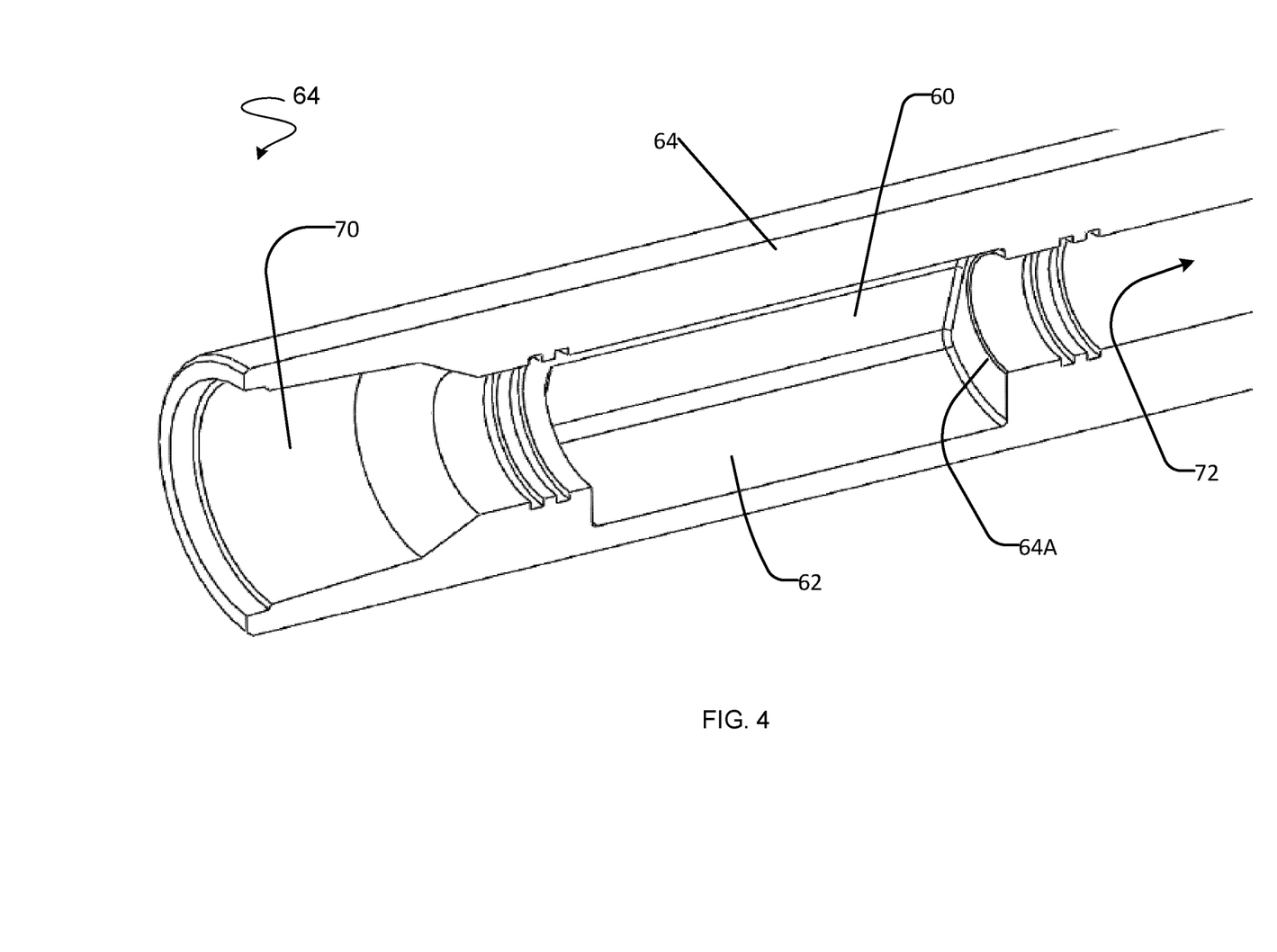
FIG. 4 is a perspective cutaway view of a downhole assembly with a pocket milled out of its internal diameter near the box end of the downhole assembly.

A downhole tool 20 as described above may be provided in any of a wide variety of form factors. For example, such a downhole tool may be provided in the form of a probe which can be located in a bore of a drill string. As another example, electronics components of downhole tool 20 and/or its sensors may be incorporated into one or more pockets provided in a wall of a drill collar. For example, as shown in FIG. 4, electronics components of a downhole tool 20 and/or its sensors may be incorporated into pockets 62 formed along a section 60 of an example drill collar 64. Pockets 62 may, for example, be formed in an inner diameter 64A which defines a bore 66 through which drilling fluid may flow while collar 64 is in use. Pocket 22 may be formed at various locations along collar 64, such as near pin end 72 (not shown), near box end 70, and/or elsewhere.

As another example, components of downhole tool 20 may be housed in a housing which surrounds a flow passage carrying drilling fluid through the bore of the drill string. In some embodiments, such a housing may comprise a plurality of separate modules which are electrically interconnected with one another. In some embodiments, a downhole tool is integrated into a specialized drill string section.

In cases where a downhole tool does incorporate a plurality of separately replaceable modules, in some embodiments, main sensors are contained in one or more replaceable modules whereas backup sensors for those main sensors are provided in one or more different modules. This construction permits different subsets of a possible full range of backup sensors to be provided in different drilling circumstances. Providing backup sensors for some but not all main sensors in a downhole tool 20 can save space, power, complexity, and cost while providing backup sensors for sensors that are particularly delicate or sensors that are particularly critical for a given drilling operation. For example, PMT-based gamma detectors can be important and can also be more delicate than sensors of other types.

In some embodiments, one or more sensors are packaged separately from some or all parts of their support circuits such that the sensors may be readily replaced without replacing the support circuits. For example, a photomultiplier tube and scintillation crystal may be provided in a stand-alone module that can be readily replaced. Support electronics for the PMT such as a high-voltage power supply, and circuits to detect and process output signals from the PMT may be provided in a separate module. The module containing the sensor (e.g. the PMT and scintillation crystal) may comprise electronics connectors which permit all connections to the associated electronics to be established by plugging in the electronics connectors. This facilitates field-replacement without the need for soldering or the like.

In another embodiment, sensors, which may include backup sensors, are provided in modules which are replaceable separately from the main interface circuit or circuits. Since electronic components (e.g. interface circuits, power supplies etc.) tend to be more rugged than sensors of many types, this construction permits replacement of any failed sensors without the need to also replace associated electronics. Furthermore, with this construction, a module containing the sensors may be located at a place which is physically spaced apart from electronics associated with downhole tool 20 in order to place the sensors in an environment that is free from electrical and/or magnetic interference from currents flowing in associated electronics.

Another advantage of providing a single interface to a plurality of sensors or at least providing a reduced number of sensor interfaces is that wiring connections between sensor interfaces are also reduced. Interconnections between electronics circuit boards or other electronics modules tend to be a point at which downhole systems can fail; reducing such interconnection can increase the reliability of a downhole tool. Furthermore, with a reduced number of sensor interfaces (one in some embodiments) communicating in either direction between a controller and associated sensors is simplified and problems associated with establishing and maintaining such communications can be reduced.

As with the example of a gamma sensor described above, other types of sensor, such as magnetometers and/or accelerometers may be packaged in modules that are separate from some or all of their associated electronics. This construction permits replacement of the sensors without the necessity of replacing also the associated electronics.

Applicability of the invention described herein is not limited to gamma sensors. The present invention may also be applied to other types of radiation sensors. In addition, the technology described herein may be used to provide backups for other types of sensors such as, for example, directional sensors, accelerometers, magnetometers and the like. The technology described herein may be used to approximate the readings of main sensors using backup sensors, so that (in the event of a main sensor failure or other event) backup sensor readings may be used in place of, or in addition to, main sensor readings. Backup sensor readings may be used to approximate main sensor readings even if the main sensor (or main sensors, as the case may be) does not perfectly accurate. For example, if a main sensor provides readings with a particular bias (e.g. over-estimating gamma readings by 5%), then the backup sensors may explicitly or implicitly approximate that bias and provide similarly biased readings.

In the case of directional sensors, backup sensors may be provided for individual axes of a directional sensor. For example, a main directional sensor may comprise a three-axis accelerometer. In some embodiments, the main accelerometer comprises one or more instrumented beams. In an example embodiment, the main accelerometer comprises a mechanical accelerometer such as a Q-Flex™ accelerometer available from Honeywell. The backup sensor may comprise a plurality of one-axis accelerometers. The backup accelerometers may, for example, comprise mechanical, MEMS or solid-state accelerometers. In some embodiments the backup accelerometers have a flex-beam construction.

Outputs of each axis of the main accelerometer may be monitored to detect failures of any axis of the main accelerometer. If any axis of the main accelerometer fails then the output acceleration value of a corresponding one of the backup accelerometers (or of an appropriate combination of outputs from two or more of the backup accelerometers) may be used to provide a replacement value for the failed axis of the main accelerometer. In some embodiments the output from the backup accelerometer is processed to yield a value that the main accelerometer would have output as raw data if the main accelerometer had been working properly. This method is facilitated in embodiments where the main accelerometer and the backup accelerometers share a custom designed interface which allows the reading from the backup accelerometer to be substituted for the reading of a failed axis of the main accelerometer close to the source.

In some embodiments calibration of the main accelerometer is based on outputs from all three axes of the main accelerometer. Substituting the value of a failed axis prior to correcting output acceleration values according to a calibration function facilitates obtaining the most-accurate acceleration values that are available. If this were not done, failure of one axis of the main accelerometer would affect the acceleration values for the non-failed axes. To avoid this, raw values of a failed sensor may be replaced with raw values of the corresponding backup sensor.

In an example embodiment, backup accelerometers are mechanically mounted directly to a housing of the main accelerometer. In some cases the housing of the main accelerometer has faces that are parallel to or perpendicular to axes of the main accelerometer and backup accelerometers are mounted so that they remain parallel to these faces This facilitates alignment of the axes of the backup accelerometers with corresponding axes of the main accelerometer. However, in some embodiments the axes of the backup accelerometers are not aligned with the axes of the main sensor; readings of the backup accelerometers may be processed and/or adjusted in order to generate readings which use the axes of the main accelerometer as a reference frame.

In some embodiments, a tool as described herein is applied in a portion of the drill string that is rotating relative to the surrounding formations. For example, the tool may be located between a mud motor, which is driving rotation of a drill bit, and a drill bit. In such embodiments, it can be desirable to obtain directional gamma readings. To facilitate this, a main gamma sensor (as well as backup gamma sensor) may be shielded on one or more sides such that the gamma sensors are much more sensitive to gamma rays from one direction than to gamma rays from other directions which are absorbed by the shielding. In such embodiments, signals from a directional sensor (e.g. a magnetometer or gyroscope) may be used to bin gamma readings such that gamma readings obtained while the sensitive direction of the gamma sensor is facing into a particular segment of the circle of rotation is accumulated together and are counted distinctly from gamma readings made while the sensitive direction of the gamma sensor is pointing in other directions. Any suitable number of bins may be provided. For example, there may be from two to 36 or more distinct bins. In some such embodiments the sensitive direction of the backup gamma sensor may be offset relative to the sensitive direction of the main gamma sensor. In such embodiments the offset may be taken into account by associating one bin of the main sensor with a different bin of the backup sensor. For example, in the case where each rotation is divided into six bins labelled zero to five and the backup sensor and the main sensor have sensitive directions that are 180 degrees apart from one another, the bins of the backup sensor may be associated with bins of the main sensor according to the following table:

| Bin for Main Sensor | Corresponding Bin for Backup Sensor |
| --- | --- |
| 0 | 3 |
| 1 | 4 |
| 2 | 5 |
| 3 | 0 |
| 4 | 1 |
| 5 | 2 |

Preferably, the offset between the main and backup sensors, if there is such an offset, is by an angle given by the following formula:

$$n \times 360 \div m$$

where n is an integer and m is the number of bins in a full rotation.

Figure 5:
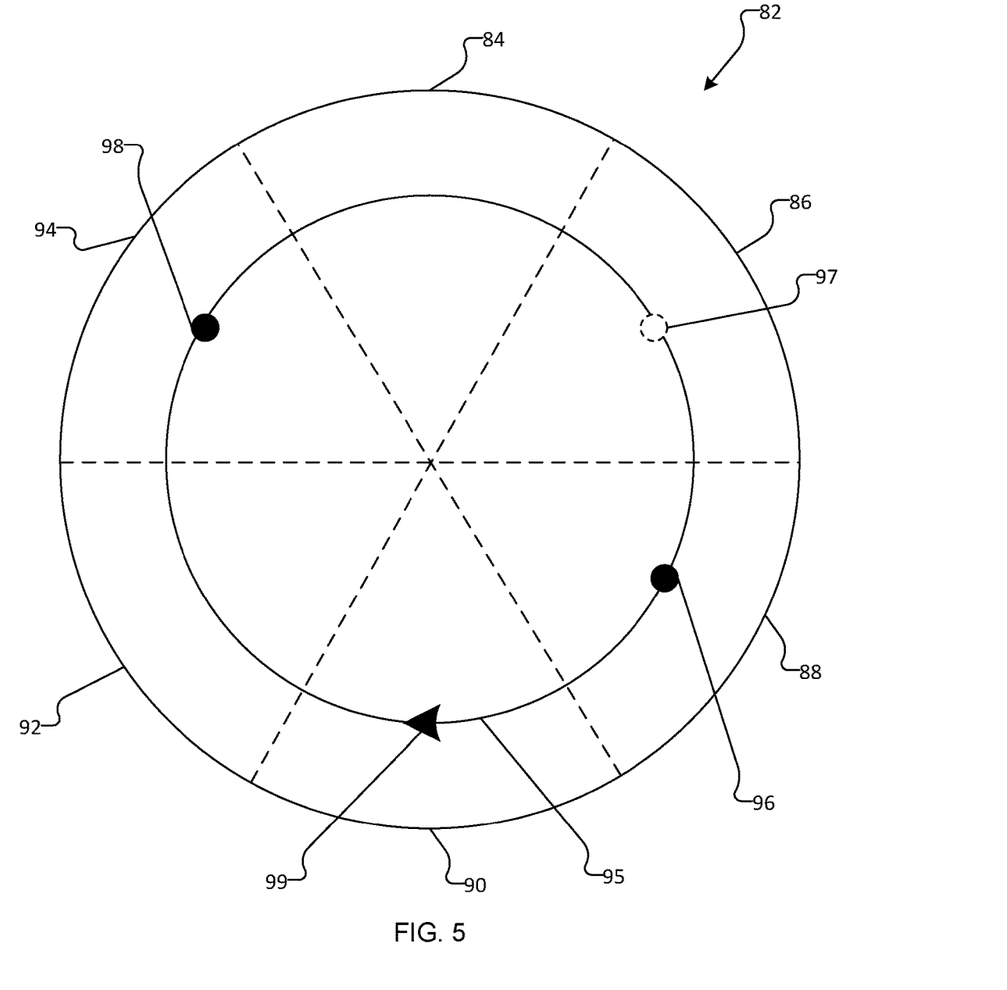
FIG. 5 is a schematic cross-sectional view of a drill string divided into bins according to an example embodiment.

FIG. 5 schematically illustrates the six-bin example provided above. Drill string 82 (shown circumferentially in cross-section) is divided into bins 84, 86, 88, 90, 92, and 94. Main sensor 96 and backup sensor 98 travel along path 95 in direction 99. While main sensor 96 is traveling through bin 88, readings taken by main sensor 96 are allocated to bin 88 (this allocation is referred to above as "binning"). As shown, bin 88 for main sensor 96 corresponds to bin 94 for backup sensor 98, and (in the depicted embodiment) vice-versa. Although FIG. 5 show main sensor 96 and backup sensor 98 in directly opposing positions, it is not necessary for main sensor 96 and backup sensor 98 to directly oppose. For example, main sensor 96 may be positioned at location 97, in which case bin 86 for main sensor 96 would correspond to bin 94 for backup sensor 98 and bin 98 for main sensor 96 would correspond to bin 90 for backup sensor 98.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

INTERPRETATION OF TERMS

Unless the context clearly requires otherwise, throughout the description and the claims:

"comprise," "comprising," and the like are to be construed in an inclusive sense, as opposed to an exclusive or exhaustive sense; that is to say, in the sense of "including, but not limited to".

"connected," "coupled," or any variant thereof, means any connection or coupling, either direct or indirect, between two or more elements; the coupling or connection between the elements can be physical, logical, or a combination thereof.

"herein," "above," "below," and words of similar import, when used to describe this specification shall refer to this specification as a whole and not to any particular portions of this specification.

"or," in reference to a list of two or more items, covers all of the following interpretations of the word: any of the items in the list, all of the items in the list, and any combination of the items in the list.

the singular forms "a," "an," and "the" also include the meaning of any appropriate plural forms.

Words that indicate directions such as "vertical," "transverse," "horizontal," "upward," "downward," "forward," "backward," "inward," "outward," "vertical," "transverse," "left," "right," "front," "back"," "top," "bottom," "below," "above," "under," and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

Where a component (e.g. a circuit, module, assembly, device, drill string component, drill rig system, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole.

What is claimed is:

1. A sensor system for use in a downhole system, the sensor system comprising:
    a first sensor operable to sense an environmental property;
    a second sensor operable to sense the environmental property; and
    a controller in communication with the first and second sensors, the controller configured to:
        receive, from the first sensor, a first calibration sensor reading acquired at a first time;
        receive, from the second sensor, a second calibration sensor reading acquired at substantially the first time;
        determine, based on the first and second calibration sensor readings, calibration information for the second sensor;
        receive, from the second sensor, a backup sensor reading acquired at a second time subsequent to the first time;
        determine, based on the calibration information and the backup sensor reading, an estimated replacement sensor reading estimating a sensor reading by the first sensor at the second time.

2. A sensor system according to claim 1, wherein the controller is configured to calibrate the second sensor to estimate the output of the first sensor so that the backup sensor reading comprises the estimated replacement sensor reading.

3. A sensor system according to claim 1, wherein:
    the controller is configured to receive, from the first sensor, a plurality of sensor readings, the plurality of sensor readings comprising the first calibration sensor reading and each of the plurality of sensor readings acquired at a time prior to the second time; and
    the controller is configured to determine the calibration information for the second sensor based on the plurality of sensor readings and the second calibration sensor reading.

4. A sensor system according to claim 1 wherein the calibration information comprises a calibration curve, the calibration curve defining a correspondence between one or more calibration factors and an adjustment value, wherein adjusting the output of the second sensor based on the adjustment value provides an estimate of the output of the first sensor.

5. A sensor system according to claim 4 wherein the one or more calibration factors comprise a temperature of at least one of the first and second sensors.

6. A sensor system according to claim 4 wherein the one or more calibration factors comprise the second time.

7. A sensor system according to claim 1 wherein the controller is configured to determine, based on the calibration information, the estimated replacement sensor reading in response to detecting a failure of the first sensor.

8. A sensor system according to claim 7 wherein the controller is configured to check the first sensor for an indication of the failure.

9. A sensor system according to claim 1 wherein each of the first and second sensors is housed in a rotatable element in the downhole system, each of the first and second sensors directionally sensitized so that the first sensor senses in substantially a first direction and the second sensor senses in substantially a second direction.

10. A sensor system according to claim 9 wherein:
    the first sensor travels along a circumferential path while the rotatable element rotates;
    a plurality of circumferential segments are defined on the circumferential path, each of the circumferential segment associated with a bin; and
    for each of the circumferential segments, sensor readings acquired by the first sensor while travelling along the circumferential segment are associated with the bin associated with the circumferential segment.

11. A sensor system according to claim 10 wherein:
    the second sensor is angularly offset from the first sensor along the circumferential path;
    for each of the circumferential segments, sensor readings acquired by the second sensor while travelling along the circumferential segment are associated with a second bin associated with a second circumferential segment;
    wherein the second circumferential segment is offset from the circumferential segment by a distance corresponding to the angular offset between the first sensor and the second sensor.

12. A sensor system according to claim 1 wherein the first sensor comprises a multi-directional sensor operable to sense the environmental property in a plurality of directions and the second sensor comprises one or more unidirectional sensors and the controller is configured to determine the estimated replacement sensor reading based on, for at least a first one of the plurality of directions, a sensor reading acquired by the first sensor and based on, for at least a second one of the plurality of directions, the backup sensor reading.

13. A sensor system according to claim 1 wherein the first and second sensors comprise accelerometers.

14. A sensor system according to claim 13 wherein the first sensor comprises a multi-axis accelerometer and the second sensor comprises one or more single-axis accelerometers.

15. A sensor system according to claim 1 wherein the first and second sensors comprise gamma radiation sensors the first sensor comprises a photomultiplier tube, and the second sensor comprises a solid-state gamma radiation sensor.

16. A sensor system according to claim 1 wherein the controller is configured to continually calibrate the second sensor against the first sensor while the first sensor is working.

17. A sensor system according to claim 1 wherein the second sensor is less sensitive than the first sensor.

18. A sensor system according to claim 1 wherein the controller is configured to obtain a reading from a third sensor taken substantially at the first time, wherein the third sensor is configured to sense a second environmental property distinct from the environmental property and the controller is configured to base the calibration information for the second sensor in part on the reading from the third sensor.

19. A sensor system according to claim 18 wherein the third sensor is a temperature sensor.

20. A sensor system according to claim 19 wherein the controller is configured to generate a calibration function relating readings of the second sensor to readings of the first sensor as a function of temperature.

21. A sensor system according to claim 1 wherein the controller is configured to maintain a log containing a history of comparisons of readings from the first and second sensors.

22. A sensor system according to claim 21 wherein the log comprises temperature readings corresponding to the readings of the first and second sensors.

23. A sensor system according to claim 21 wherein the log comprises times corresponding to the readings of the first and second sensors.

24. A sensor system according to claim 23 wherein the calibration curves include curves that which relate the sensitivity of the second sensor to the sensitivity of the first sensor as a function of time.

25. A sensor system according to claim 22 wherein the controller is configured to process data from the log to yield one or more calibration curves which relate the sensitivity of the second sensor to the sensitivity of the first sensor as a function of temperature.

26. A sensor system according to claim 1 wherein the second sensor comprises a backup gamma sensor and the controller is configured to estimate a rate of drift of the sensitivity of the backup gamma sensor.

27. A sensor system according to claim 1 wherein the controller is configured to transmit the calibration information to surface equipment together with a measure of quality of a current calibration wherein the measure of quality comprises a residual based on differences between one or more readings of the first sensor and one or more corresponding estimated replacement sensor readings.

28. A sensor system according to claim 1 wherein the controller is distributed and includes a first component at a downhole tool comprising the first and second sensors and a second component at a surface location and a telemetry system providing data communication between the first and second components.

29. A sensor system according to claim 1 wherein the controller is configured to periodically take new readings from the first and second sensors and to update the calibration information for the second sensor based on the new readings from the first and second sensors.

30. A sensor system according to claim 1 wherein the controller is configured to automatically process readings from the second sensor using the calibration information to yield estimated readings for the first sensor and to transmit the estimated readings to surface equipment in response to detecting a failure of the first sensor.

* * * * *